United States Patent Office 3,573,082
Patented Mar. 30, 1971

3,573,082
BIOLOGICAL SPECIMENS AND PROCESS OF
PRESERVING SAME
Calvin R. Fremling, Winona, Minn., assignor to
Nasco Industries, Inc., Atkinson, Wis.
No Drawing. Filed Apr. 16, 1968, Ser. No. 721,616
Int. Cl. A01n 1/00
U.S. Cl. 117—3.0                                           16 Claims

ABSTRACT OF THE DISCLOSURE

The process of preserving animal and plant specimens involving the use of glycol and a biological specimen impregnated with a fixative and an alkylene glycol aqueous composition.

SUMMARY OF THE INVENTION

The specimen is first normally killed and either the entire animal or plant, or the organ or portion thereof to be preserved, is fixed to stop the decaying process. The specimen may be washed in water to remove most of the fixative and may also be washed repeatedly in the glycol preservative of the invention for this purpose. The fixative is substantially replaced by the preservative of the invention, or some of it may chemically react therewith, to produce the plurality of advantages set forth. The specimen may be placed in a bath of the preservative of the invention and the bath agitated to precipitate the fixative from the specimen and out of the bath and to produce maximum contact of the preservative with the specimen, the precipitation of the fixative serving to maintain the preservative bath of the invention against contamination or, possibly, to facilitate any reaction that may occur, or both. The preservative of the invention is a homogenous miscible alkylene glycol and water mixture. Some specimens may be immersed in alkylene glycol alone, having water added at a later time to produce the desired glycol-water relationship in the specimen and to produce the specimen of the invention having the resultant desirable characteristics set forth.

This invention relates to biological specimens or materials, such as animals, plants and organs or parts of the same and to the preservation thereof.

In the production of specimens for biological studies and classroom use, most specimens are normally fixed promptly after being killed and must then be preserved. A variety of fixatives has been employed in the past. Formaldehyde is most commonly used, though alcohol, phenol, picric acid, acetic acid, chromic acid and other fixative formulations or solutions have been employed. Fixation results in the coagulation of proteins in the tissues of the specimen and the immobilization or destruction of decaying agents, such as fungi and bacteria, in order to halt the decaying process.

In the past the specimens have normally been preserved in the same fixative fluid for shipment to the classroom or place of use. Specimens have been removed from such fluid, primarily formaldehyde, for study, dissection and the like, and returned to the fluid for continued preservation. While formaldehyde, being the most economical and available in quantity, has been productive of most of the disadvantages of past preservatives, all of such past preservatives have been productive of one or more of the disadvantages listed herein.

The central educational experience in the science and study of biology inolves the dissection of biological specimens.

The strong, disagreeable odor of past specimen preservatives has made the study and continuation in the field of the biological sciences unattractive to numerous students. It has also required the construction of biological laboratories having special, partially effective odor-diminishing equipment. Accordingly, it is among the purposes of the invention to provide substantially odorless specimens and to provide a method or process of preserving biological materials which shall result in substantially odorless specimens.

Past preservatives have been toxic in varying degrees and it is another purpose of the invention to provide a substantially non-toxic specimen and to provide a non-toxic method for preserving biological specimens.

Past preservatives and specimens preserved therein have been irritating and painful to the skin and to the eyes and the nose. It is thus another purpose of the invention to provide a process and a specimen which shall be substantially painless and nonirritating.

Another purpose of the invention is to provide a process and a specimen which shall be substantially nonflammable and nonexplosive.

Another purpose is to provide a preservation process employing a preservative which shall be noncorrosive to containers in which the preservative or the specimen containing said preservative may be shipped or stored.

Alcohol preservatives have involved taxes, permits, repeated reports and inventory controls. Accordingly, it is another purpose to provide a preservation process and preservative requiring no such taxes, permits, reports or controls.

Past preservatives have resulted in specimens either greatly faded or having an unattractive and misleading color. Accordingly, it is another purpose to provide a process which shall result in the preservation and maintenance of the color displayed by the specimen at the time it was subjected to said process.

Past preservatives have resulted in hard or stiffened specimens and in boned specimens having virtually rigid joints. Accordingly, it is another purpose of the invention to provide specimens so preserved as to remain soft and pliable and to provide boned specimens having flexible joints.

Past preservatives have resulted in specimens having tissues so brittle as to break and crumble when cut in an effort to dissect the same. Accordingly, it is another purpose of the invention to provide specimens sufficiently pliable to be dissectible without the crushing, crumbling or breaking up of the tissues thereof.

Past preservatives have resulted in specimens which dry out within as little as one-day's use, thus requiring repeated additions of preservative fluid. Accordingly, it is another purpose to provide a specimen so preserved as to be available in the classroom and elsewhere for long periods of study, dissection, display and use and to provide a specimen which shall attract and hold moisture, as well as to provide a specimen which can be reconstituted between uses with the addition of small quantities of moisture.

Past preservatives have required the shipment of most specimens in sufficiently large quantities of preservative fluid. It is another purpose of the present invention to provide a specimen so preserved as to be shipable in a polyethylene bag without any substantial quantity of preservative beyond that carried by and within the specimen itself.

Another purpose is to provide a process involving the impregnation of biological specimens in stages of increasing glycol concentration.

Another purpose is to provide a means and method of preserving biological specimens as nearly in their natural state as possible.

Another purpose is to provide a specimen which may be dissected and otherwise handled without deleterious effect upon wearers of eye make-up or contact lenses.

Another purpose is to provide specimens which may be dissected and otherwise handled without a need for safety goggles.

Another purpose of the invention is to provide a method of preserving specimens which shall result in the maximum contact and absorption of the preservative with and by the specimen.

Another purpose is to provide a preservation process involving initial preservation in a preservative having a first glycol concentration and a later addition of water to lower said concentration.

Another purpose is to provide specimens capable of storage in sealed, air-filled plastic bags and in open atmosphere for extended periods without spoilage.

In accordance with the preferred method of the invention, the previously fixed specimen is washed in water to remove most of the fixative or fixative-preservative substance from the specimen. The washing step may involve varied periods of time, from 1 hour for planaria to a period of the order of 3 hours for medium-size specimens, and to a period of 24 hours for specimens as large as a cat. After washing, the specimen is immersed in a miscible, homogenous glycol-water solution. While tap water may be used, soft water is preferred in order to avoid the minerals often present in tap water.

In the preservation of relatively small specimens, a relatively small number of such specimens may, in accordance with the process of the invention, be placed directly into the glycol-water solution or bath and the washing out of the fixative substance and the substitution of the preservative of the invention may be accomplished substantially simultaneously. While such simultaneous operations may be accomplished with larger specimens or larger numbers of small specimens, the time and bath-size requirements are such as to indicate a preference for accomplishing a major portion of the washing step in water alone before immersing the larger specimens in the glycol-water solution. In either case, the fixative will be driven off by a washing action of water.

The specimen is allowed to soak in a glycol-water solution for a length of time suitable to the specimen. It has been found preferable, for example, to permit smaller specimens to remain immersed in the glycol-water solution for approximately 24 hours, while permitting specimens as large as a cat, for example, to remain immersed in the glycol-water solution for as long as 7 days. The period of immersing may be shortened when the specimen is cut or opened to permit ready access of the glycol-water solution to internal organs.

With fragile specimens it has been found preferable to immerse the same in glycol-water solutions having a lesser concentration of glycol, say 20%, and, after a period of time suitable to the specimen size, to transfer the specimen to a glycol-water bath or solution having a larger, say 25%, glycol concentration. In such event the specimen is permitted to remain in this second bath for the same period of time employed in connection with the first bath. In this manner shrinkage tending to occur in some specimens upon submission to a bath or solution having the higher glycol concentration is avoided and it is possible to achieve a greater concentration of glycol in the specimen, while avoiding such shrinkage, by such graduated submission of the specimen to solutions of lower and then higher glycol concentration, resulting in the removal of more of the water from the specimen and replacement thereof with the glycol constituent.

With other, normally tough specimens it has been found fully satisfactory to immerse the same in a single bath of a higher glycol concentration.

After the passage of a suitable period, during which the specimen absorbs or becomes impregnated with the glycol preservative, the specimen may be removed from its glycol-water bath and placed in a suitable container, a sealed polyethylene bag being found perfectly suitable. While the specimen could be kept in a glycol-water solution, its shipment, storage and handling between periods of use is facilitated by employment of such a flexible bag container and the present invention makes such improved shipment and handling possible.

Placement of the specimen in a sealed container, such as the polyethylene bag referred to, between periods of use or display, serves to keep the specimen moist. If not replaced in such container or supplied with moisture, the specimen resulting from the invention would very slowly dry out, but it would not spoil. Prior specimens remaining out of prior preservatives solutions will much more quickly dry out and may decompose or spoil.

The specimen preserved in accordance with the invention herein, however, will remain moist and flexible for extended periods of time and will not only fail to spoil, but would appear to become even more preserved against spoilage as the specimen slowly dries. The escape of water from the specimen in drying has the effect of an increase of glycol concentration in the specimen.

It is believed that the specimen is preserved, even in its moist state, against spoilage because the present invention makes it osmotically impossible for a decaying or spoiling organism, such as a bacterium or mold organism, to extract from the specimen the water required for the life or growth of the decaying organism. Since the decay organism is over 75% water and the specimen water content is substantially less than 75%, the organism cannot acquire the water it needs to grow or multiply. It is believed that the invention thus renders the specimen a type of physiological desert. In effect it appears that the specimen is more likely to draw water from the organism than the other way around. While some water remains in the specimen, giving it is flexibility and ease of dissection, that water is not available to the decaying organism which cannot pull the water from the specimen against the osmotic gradient. Thus the reduction of water content in the specimen due to drying results in further removing any chance of supplying water to a decay organism and further insuring against spoilage.

The presence of formaldehyde fumes noted adjacent an agitating glycol-water bath would appear to indicate that the formaldehyde fixative is being driven off and replaced by the glycol-water solution. A major object and achievement of the invention, however, is elimination of the specimen odor so long endured. Washing the specimen in water may drive off or dilute the fixative or it may reduce the quantity remaining for reaction with the glycol substance or both. Whatever may be the particular details of the manner in which the process works, persons skilled in the art will find it easy to practice from the disclosure herein and will find that the process of the invention results in biological specimens of good preservation, color, size, flexibiliay and dissectibility and that it results in substantially odorless specimens.

Specimens preserved in accordance with the invention have remained unspoiled and have failed to decompose for more than a year during which the specimens were occasionally returned to a glycol-water solution only to the extent necessary to overcome undue dryness. Specimens have been left continuously exposed to air for weeks with no indication of decomposition whatsoever.

Approximately 1,000 frogs had been preserved in a barrel of formaldehyde solution or formalin for about 3 years. These frogs were hard and inflexible and therefore very difficult to dissect. The frogs were washed in water with the intent to remove and drive off a major portion of the formaldehyde from the frog specimens. A solution containing 25% ethylene glycol and 75% water by volume was washed through the frogs in the barrel with the intent to drive off a further portion of the formaldehyde and to supplant the same in the specimens with the ethylene glycol-water solution. The barrel was filled with the 25% ethylene glycol-75% water solution and the barrel was closed. After two weeks, the cover was removed from the barrel and only the very slightest trace of formaldehyde odor was noted upon removal of the cover. Even this slight trace of odor substantially disappeared virtually immediately. Periodicaly, over the next three days, workers reached down in the golycol-water bath, immersing their unprotected hands and foreams, and removed frogs therefrom. No deleterious, toxic, painful or annoying effects were noted by any of these workers. The frogs were found to be of excellent color, odorless, flexible, pliable and easily dissectible. Some of the frogs removed from the barrel on the first day were placed open to atmosphere on a shelf and were, after three days of such exposure, found to be fully preserved and substantially identical in color, odorlessness, flexibility, pliability and dissectibility with those removed for the first time from the barrel on the third day.

A large cat preserved in accordance with the invention, and with the employment of a solution consisting of 25% ethylene glycol and 75% water by volume, was removed from the glycol-water solution and dissected in open air over a period of three days, the cat remaining exposed to air throughout the three-day dissection period. There was no odor detected at any time. The tissues of the cat specimen were as easily dissected on the third day as on the first. The color of the cat and each of its organs appeared to remain constant throughout the dissection period.

It has been found that the concentration of glycol in the preservative of the invention is of importance. If such concentration be too great, the specimen will tend to shrivel, harden and shrink. This may, in some instances, be undesirable, though, as explained below, a later addition of water may produce the desired characteristics in the specimen. If the concentration of glycol be too small, the resulting excess of water may cause the specimen to swell up or bloat and may, in some instances, result in subjecting the specimen to spoilage.

While ethylene glycol has been referred to above, the examples of experiments discussed below establish that other glycols or glycol compounds are usable. While ethylene glycol is preferred because it appears less greasy, because of its economy and availability and because its smaller molecule appears to facilitates its diffusing into the specimen, the invention is not restricted to the use of ethylene glycol in the glycol-water solution of the invention.

For example, a supply of frogs were fixed and preserved in formalin and were then washed in cool water for five days. Each frog was then placed in a separate polyethylene bag. The bags contained glycol-tap water solutions having the glycols and concentrations indicated in the Table I. The bags were then sealed and hung on a rack. Eleven days later the fluid was drained from all bags. Each frog was examined as to color, flexibility, shrinking-bloating and each frog was dissected to determine its dissectibility and the appearance of internal organs. The symbols "P" for poor, "F" for fair, "G" for good and "E" for excellent were applied to the color, flexibiliay, shrinking-bloating and dissectibility characteristics of the specimens as preserved in the particular glycol compound and concentrations indicated in the table.

TABLE I

| | Color | | | | Flexibility | | | |
|---|---|---|---|---|---|---|---|---|
| | 10% | 20% | 30% | 40% | 10% | 20% | 30% | 40% |
| Ethylene glycol | | F | G | | | G | F | |
| Diethylene glycol | F | F | P | P | P | G | G | P |
| Triethylene glycol | P | G | G | P | P | G | P | P |
| Tetraethylene glycol | G | G | P | P | G | F | P | P |
| Hexylene glycol | P | G | P | F | P | P | P | P |
| Propylene glycol | G | G | G | P | G | E | G | P |
| Dipropylene glycol | E | E | G | P | P | F | G | P |

| | Shrinking-bloating | | | | Dissectibility | | | |
|---|---|---|---|---|---|---|---|---|
| | 10% | 20% | 30% | 40% | 10% | 20% | 30% | 40% |
| Ethylene glycol | | G | E | | | F | G | |
| Diethylene glycol | P | F | G | G | P | G | G | F |
| Triethylene glycol | P | G | G | G | P | G | P | P |
| Tetraethylene glycol | F | G | G | G | G | G | F | F |
| Hexylene glycol | F | G | G | G | F | F | P | F |
| Propylene glycol | P | G | G | G | G | G | G | F |
| Dipropylene glycol | G | G | G | G | G | E | G | P |

In the examples of Table I, only 20% and 30% ethylene glycol concentrations were employed since previous experiments established that the 10% concentration resulted in undersirable bloating and the 40% concentration resulted in undesirable rigidity.

Following determination and noting of the characteristics set forth in Table I, each test frog was then contaminated by stroking it with a moldy frog. The moldy frog had been preserved in formalin, washed in water for four days and incubated at room temperature in an air-filled polyethylene plastic bag. Each test frog was then incubated and its original polyethylene bag. After five days the specimens were observed and all were found to be unspoiled with the exception of those preserved in 10% and 20% tetraethylene glycol and 10% propylene glycol.

The specimens remained in their original bags and were again observed six days later. All of the specimens which on the previous observation were seen to be unspoiled remained unspoiled, with the exception of that spreserved in 10% dipropylene glycol. The sole indication of spoilage in the specimens so described consisted of spots of mold.

It is believed that concentrations of glycol as low as 10%, leaving a high water content in the specimen and thus available to decay organism, produced the spoilage observed. The apparent spoilage in 20% tetraethylene glycol and the absence of spoilage in other 10% concentrations appear to result from unknown causes.

A second cat specimen, killed and fixed in formalin, was washed and immersed in a solution of 25% ethylene glycol—75% water by volume. After 7 days this cat specimen was removed from said solution and observed to be of excellent color, odorless and neither shrunken nor bloated. The specimen was sealed in an air-filled polyethylene bag. After 62 days it was removed from the bag and dissected with ease in the classroom. It was observed to have retained its color, suppleness and flexibility and to have remained odorless and unspoiled. The specimen was laid out and exposed to atmosphere for 12 hours after dissection. It was at that time observed to be a trifle dry. A few wet paper towels were placed in the bag with the cat specimen and the specimen was observed, 24 hours later, to have returned to the normal moist condition which it displayed upon original removal from the glycol-water solution and on its removal from the bag for dissection on the previous day. It also continued to display its odorlessness, color, size, flexibility, pliability and dissectibility.

Five frogs were killed, fixed in formalin and then washed, each in an ethylene glycol-water solution having a different concentration of ethylene glycol. Thereafter each frog was removed from its glycol-water sodlution, observed and subjected to dissection. All of the frogs were odorless. That preserved in a 10% ethylene glycol solution was bloated but dissected very well. That preserved in a 20% solution was of normal size and dissected equally well, all of its organs, like those of the frog preserved in the 10% solution, having a rubbery constituency and none displaying any tendency whatever to crack or crumble. The frog preserved in a 30% solution displayed fair dissectibility but was slightly more hard or rigid than those preserved in the 10% or 20% solutions. The frog preserved in a 50% solution displayed a greater hardness or rigidity and was very difficult to dissect, while the frog preserved in a 75% solution was as hard as a rock and virtually nondissectible.

A frog was killed, fixed in formalin, washed and immersed in a 25% ethylene glycol-75% water solution. The next day the frog was removed from the solution and rubbed on the floor in an effort to contaminate it. The frog was then sealed in a polyethylene, air-filled, plastic bag with no liquid whatever therein, except that contained in the specimen. The frog was removed from the bag after 24 days and found to be odorless, completely unspoiled, and of good color, flexibility, pliability, size and dissectibility characteristics.

In addition to the specimens listed in the examples herein, the preservative and process of the invention have been successfully employed in the preservation of various fish, snakes, starfish, sea anemones, Ascaris worms, fetal pigs, clams, rats, brains, hearts and kidney.

While spoilage of some specimens was noted in connection with preservative solutions of low glycol concentration and after passage of time, it will be understood that such specimens displayed others of the desirable characteristics set forth herein and, in some instances, it may be possible to employ such lower concentration in treating specimens immediately prior to dissection, which specimens are intended for prompt discard after dissection.

The agitation of the specimen-bath provides increased contact of the glycol-water solution with the specimen, tending to break up the film or halo of water believed to be escaping from the specimen and thus to prevent insulation of the specimen from the glycol. Such agitation is also believed to precipitate the fixative, such as formaldehyde, from the glycol-water bath, thus extending the life of the glycol-water bath by removing the formaldehyde contaminant.

If desired, it will be understood that some biological specimens may be fully preserved against spoiling in accordance with the present invention by fixing them in formaldehyde and then immersing the specimens in a bath or solution having a normally unduly high concentration of glycol, a concentration of the order of, say 35% to 85%. A bath consisting of 100% glycol may be used, though economic consideration may militate thereagainst.

The resulting specimens will be rigid and virtually nondissectible, though they will retain the odorlessness and other advantages produced by baths of, say, 18%–25% glycol concentration. The higher the glycol concentration, the more rigid the specimen will be. Baths of such higher concentrations may produce an unacceptable shrinking and shriveling of fragile specimens. In any event, the rigid specimens resulting from impregnation with such higher glycol concentrations may be shipped in such rigid state to a place of use and there immersed in water for a time sufficient to return the concentration in the specimen to that desired. With the addition of water the specimen, if shrunk, will expand and its rigidity will disappear, rendering the specimen again flexible and easily dissectible.

The biological specimens of the invention impregnated with glycol or with a glycol-water solution and being odorless, of good preservation, color, consistency, flexibility, pliability and dissectibility, are believed to constitue new products of manufacture never before available to the science of biology.

If desired, a small quantity of a fragrance-producing substance or perfume agent may be added to the glycol-water solution to give the specimen a particularly pleasing fragrance. In general, however, and except for certain botanical specimens whose natural fragrance may be substantially duplicated, the imposition of a fragrance would tend to create an unnatural or abnormal atmosphere about a specimen which in life would produce no such fragrance.

Whereas there has been described a biological specimen and a process for preservation of biological specimens and certain examples have been set forth, it will be understood that modifications and applications thereof may occur to those skilled in the art without departing from the nature and scope of the invention. One such instance would be the application of the process to the preservation or embalming of human cadavers, which are equally biological specimens with those listed in the examples given. Such application would result in achievement of the same advantages. As another example, impregnation of the specimen with glycol or a glycol-water solution, while easily and preferably accomplished by immersing the specimen in a suitable bath, might be accomplished by injection or other method without departing from the nature and scope of the invention. While the terms "glycol" and "glycol-water solution" have been employed in the foregoing description, reference is intended to the linear, branched or cyclic "alkylene glycol" and "alkylene glycol-water solutions." Hence the term "glycol" should be understood to mean an "alkylene glycol" which may be linear, branched or cyclic throughout said description. The term "aqueous alkylene glycol compositions" may also be used to refer to mixtures of the foregoing types of alkylene glycols with water. It is desired, therefore, that the invention be considered in the light of its advance in the art as made plain in the claims and in the foregoing description.

Similarly, while most specimens will be in fact substantially odorless, there are some specimens whose odor survives all known preservative treatments and odor-masking substances. The presence of such odor may, in some instances, lend further authenticity to the specimen. In any event, the word "odorless" as used herein should be understood to mean the absence of any odor imparted to the specimen by the preservative or process of the invention.

The embodiments of the invention in which an exclusive property or privilege is claimed are defined as follows:

1. The process of producing a preserved biological specimen for classroom dissection and having flexible joints, supple tissues and non-odorous, non-toxic characteristics, which consists in the steps of fixing the specimen in an odorous formaldehyde-water solution, washing the specimen to remove a major portion only of said fixative and impregnating the specimen with an aqueous alkylene glycol composition comprised of 15% to 40% alkylene glycol and 85% to 60% water by volume, employing water in said washing step and continuing said washing and impregnating steps until the remaining formaldehyde in the specimen is non-odor producing.

2. The process of preparing preserved, dissectible, biological specimens which consists in killing said specimens, impregnating said specimens with a formaldehyde fixative to fix the same against immediate decay, soaking said specimens in water for a time sufficient to remove a major portion only of said fixative and impregnating said specimens with an alkylene glycol water solution.

3. The process of claim 2 wherein said solution comprises between 15% and 40% alkylene glycol and between 85% and 60% water by volume.

4. The process of claim 2 characterized by and including the steps of impregnating said specimens by immersing the same in said alkylene glycol-water solution and agitating said solution while said specimens are immersed therein.

5. The process of claim 2 wherein said fixative is a formaldehyde-water solution.

6. The process of claim 2 characterized by and including the step of thereafter impregnating said specimens with a second alkylene glycol-water solution having a higher alkylene glycol concentration than that of said first-named alkylene glycol-water solution.

7. The process of claim 2 wherein said step of impregnating said specimens with an alkylene glycol-water solution comprises the steps of impregnating said specimens with alkylene glycol and thereafter impregnating said specimens with sufficient water to render said specimens pliable.

8. The process of claim 2 wherein said alkylene glycol-water solution is comprised of 25% ethylene glycol and 75% water by volume.

9. The process of claim 2 wherein said alkylene-glycol-water solution consists of 15% to 40% ethylene glycol and 85% to 60% water by volume.

10. The process of claim 7 wherein said alkylene glycol impregnated specimens are impregnated with sufficient water to reduce the lkylene glycol concentration to between 15% and 40% by volume in relation to the alkylene glycol-water solution resulting from said water impregnation.

11. A preserved, dissectible, biological specimen containing a non-odor producing quantity of formaldehyde and an ethylene glycol solution comprised of ethylene glycol of the order of 25% and water of the order of 75% by volume.

12. A preserved, classroom dissectible, biological specimen having pliable tissue, said specimen being impregnated with and containing a normally odorous formaldehyde fixative, an alkylene glycol and water, the quantity of said formaldehyde fixative being non-odor producing, the quantity of said alkylene glycol and said water being such as to preclude the specimen-decaying action of decay organisms contacting said specimen.

13. The specimen of claim 12 wherein the quantitative relationship of said glycol and water comprises 15% to 40% alkylene glycol and 85% to 60% water by volume.

14. The specimen of claim 12 wherein the quantitative relationship of said glycol and water comprises 15% to 40% ethylene glycol and 85% to 60% water by volume.

15. The specimen of claim 12 wherein the water content of said alkylene glycol and water quantity is less than 90%.

16. The specimen of claim 12 wherein the quantitative relationship of said glycol and water comprises 25% ethylene glycol and 75% water by volume.

References Cited

UNITED STATES PATENTS

| | | | |
|---|---|---|---|
| 1,086,265 | 2/1914 | Barrows | 117—3X |
| 1,489,130 | 4/1924 | Koropp et al. | 117—3 |
| 2,693,417 | 11/1954 | Orth | 99—3 |
| 2,720,726 | 10/1955 | Ferguson | 117—3X |
| 2,786,081 | 3/1957 | Kress | 424—75X |
| 2,977,282 | 3/1961 | Gray | 117—3X |
| 3,000,782 | 9/1961 | Landau et al. | 424—75 |
| 3,045,394 | 7/1962 | Coulter | 117—3 |
| 3,116,969 | 1/1964 | Coleman | 21—58X |
| 3,157,964 | 11/1964 | Ferguson et al. | 117—30X |
| 3,169,905 | 2/1965 | Lambert | 21—58X |
| 3,291,580 | 12/1966 | Malick | 424—342X |
| 3,433,578 | 3/1969 | Reid | 21—58X |

WILLIAM D. MARTIN, Primary Examiner

H. J. GWINNELL, Assistant Examiner

U.S. Cl. X.R.

8—94.11; 424—75, 334

PO-1050
(5/69)

UNITED STATES PATENT OFFICE
CERTIFICATE OF CORRECTION

Patent No. 3,573,082          Dated March 30, 1971

Inventor(s) Calvin R. Fremling

It is certified that error appears in the above-identified patent and that said Letters Patent are hereby corrected as shown below:

Column 1, Line 5, for "Atkinson" read -- Fort Atkinson --.

Column 2, Line 5, for "inolves" read -- involves --.

Column 4, Line 51, for "is" read -- its --.

Column 4, Line 71, for "fiexibiliay" read -- flexibility --

Column 5, Line 22, for "golycol" read -- glycol --.

Column 5, Line 23, for "foreams" read -- forearms --.

Column 5, Line 60, for "facilitates" read -- facilitate --.

Column 5, Line 75, for "flexibiliay" read -- flexibility --

Column 6, Line 33, for "and" read -- in --.

Column 6, Line 40, for "spreserved" read -- preserved --.

Column 6, Line 72, for "sodlution" read -- solution --.

Column 7, Lines 70,71, for "constitue" read -- constitute -

Column 9, Line 20, for "lkylene" read -- alkylene --.

Signed and sealed this 17th day of August 1971.

(SEAL)
Attest:

EDWARD M.FLETCHER,JR.             WILLIAM E. SCHUYLER, JR
Attesting Officer                 Commissioner of Patents